(12) United States Patent
Reiter et al.

(10) Patent No.: US 9,391,532 B2
(45) Date of Patent: Jul. 12, 2016

(54) SYSTEM AND METHOD FOR A SWITCHED-MODE POWER CONVERTER

(71) Applicant: Infineon Technologies AG, Neubiberg (DE)

(72) Inventors: Tomas Reiter, Munich (DE); Sandra Zeljkovic, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 348 days.

(21) Appl. No.: 13/828,794

(22) Filed: Mar. 14, 2013

(65) Prior Publication Data

US 2014/0268903 A1  Sep. 18, 2014

(51) Int. Cl.
*H02M 3/335* (2006.01)
*H02M 3/337* (2006.01)
*H02M 1/10* (2006.01)

(52) U.S. Cl.
CPC .............. *H02M 3/3376* (2013.01); *H02M 1/10* (2013.01); *H02M 3/337* (2013.01); *H02M 3/3372* (2013.01)

(58) Field of Classification Search
CPC ............ H02M 3/3376; H02M 3/3372; H02M 3/33592
USPC ........... 363/17, 20, 21.02–21.06, 21.1–21.11, 363/22–26, 35, 50–51, 53, 56.01–56.05, 363/97–98, 125–127, 131–134
See application file for complete search history.

(56) References Cited

U.S. PATENT DOCUMENTS

| | | | |
|---|---|---|---|
| 5,418,704 A | 5/1995 | Hua et al. | |
| 5,907,481 A * | 5/1999 | Svardsjo | 363/25 |
| 6,038,142 A * | 3/2000 | Fraidlin et al. | 363/17 |
| 6,330,170 B1 * | 12/2001 | Wang et al. | 363/37 |
| 6,445,599 B1 * | 9/2002 | Nguyen | 363/25 |
| 6,728,118 B1 * | 4/2004 | Chen et al. | 363/24 |
| 7,480,162 B2 * | 1/2009 | Price et al. | 363/134 |
| 7,759,827 B2 * | 7/2010 | Kunow et al. | 307/147 |
| 8,094,469 B2 | 1/2012 | Fujiyoshi et al. | |
| 9,048,743 B2 * | 6/2015 | Luh | H02M 3/33576 |
| 2004/0136209 A1 | 7/2004 | Hosokawa et al. | |

(Continued)

FOREIGN PATENT DOCUMENTS

| | | |
|---|---|---|
| CN | 101795076 A | 8/2010 |
| DE | 4414677 A1 | 4/1994 |
| DE | 10227832 C1 | 6/2002 |
| EP | 2410645 A1 | 1/2012 |
| JP | 2004215469 A | 7/2004 |
| WO | 2008020629 A1 | 2/2008 |

OTHER PUBLICATIONS

X. Wu et al. "Low Voltage and Current Stress ZVZCS Full Bridge DC-DC Converter Using Center Tapped Rectifier Reset". IEEE Transactions on Idustrial Electronics, vol. 55, No. 3, pp. 1470-1477. Mar. 2008.*

(Continued)

*Primary Examiner* — Gary L Laxton
*Assistant Examiner* — Kevin H Sprenger
(74) *Attorney, Agent, or Firm* — Slater Matsil, LLP

(57) ABSTRACT

In accordance with an embodiment, a power converter includes an H-bridge switching arrangement, a transformer having a primary winding coupled to an output of the H-bridge switching arrangement, a first switch coupled between a power input of the H-bridge switching arrangement and a first power supply node, and a second switch coupled between a center-tap of the primary winding of the transformer and a low impedance node.

28 Claims, 9 Drawing Sheets

(56) References Cited

U.S. PATENT DOCUMENTS

| | | |
|---|---|---|
| 2005/0041439 A1* | 2/2005 | Jang et al. .................. 363/17 |
| 2005/0226009 A1 | 10/2005 | Jitaru |
| 2007/0236967 A1* | 10/2007 | Liu et al. ................. 363/21.02 |
| 2008/0316773 A1* | 12/2008 | Neubarth ............ H02M 3/3384 363/17 |
| 2010/0220500 A1 | 9/2010 | Mino et al. |
| 2012/0250359 A1 | 10/2012 | Knill |
| 2014/0133190 A1* | 5/2014 | Asinovski ................. 363/21.03 |
| 2014/0334195 A1* | 11/2014 | Nussbaum ............ H02M 1/36 363/21.04 |

OTHER PUBLICATIONS

V. Yakushev et al. "Full-Bridge Isolated Current Fed Converter with Active Clamp," Applied Power Electronics Conference and Exposition, 1999. APEC '99. Fourteenth Annual , vol. 1, No., pp. 560,566 vol. 1, Mar. 14-18, 1999.*

Andreycak, Bill, "Phase Shifted, Zero Voltage Transition Design Considerations and the UC3875 PWM Controller," Unitrode Application Note, U-136A, May 1997, pp. 1-15.

* cited by examiner

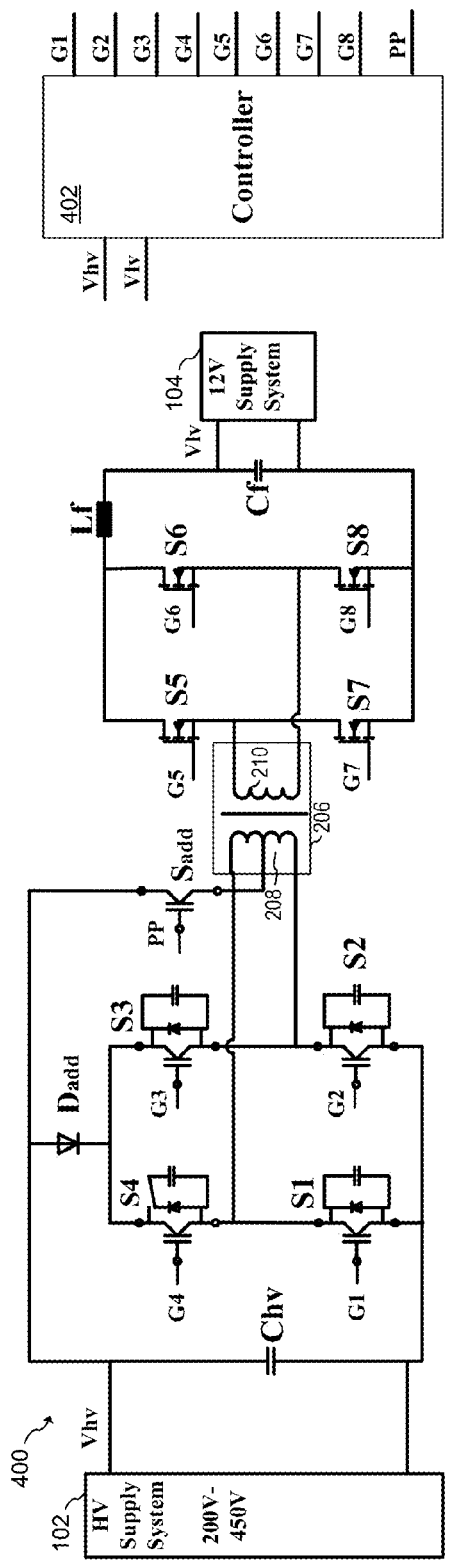
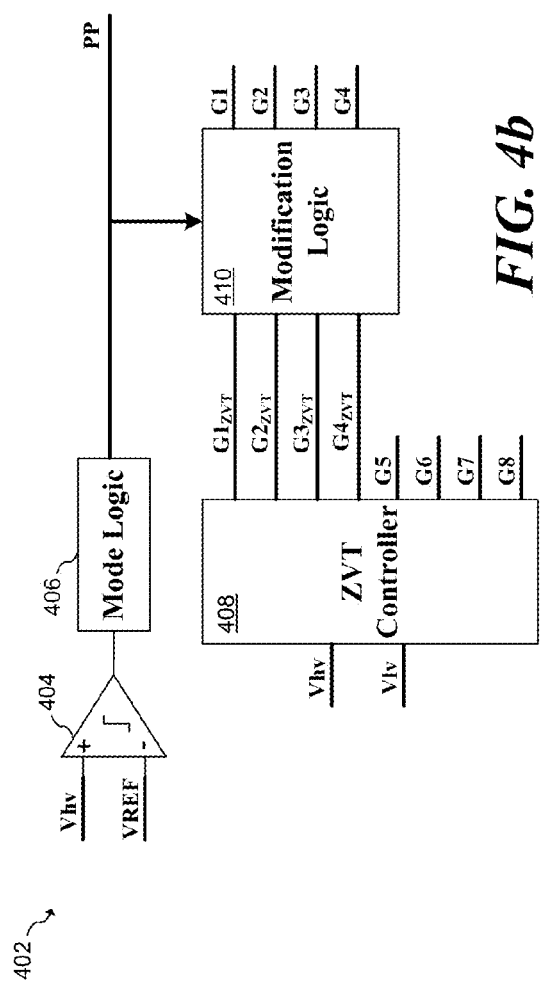
FIG. 4a
FIG. 4b

SYSTEM AND METHOD FOR A SWITCHED-MODE POWER CONVERTER

TECHNICAL FIELD

This invention relates generally to semiconductor circuits and methods, and more particularly to a system and method for switched-mode power converter.

BACKGROUND

Switched-mode power converters are used in a wide variety of electronic applications from simple consumer electronic applications such as power supplies for cellular phone chargers and personal computers, to industrial applications such as providing regulated power to heavy machinery. Because of their potential for achieving high levels of efficiency, switched mode power converters are also used in electric vehicles and hybrid electric vehicles to convert power between high voltage battery systems and lower voltage 12 V or 48 V supply systems. One of the requirements of such a switched-mode power converter is the ability to provide output power from a wide range of input voltages. For example, a typical electric car battery system may provide output voltages of between about 200 V and about 450 V depending on the state of charge of the battery system.

Designing a switched-mode power converter with a wide range of input voltages poses a number of challenges. One of these challenges is maintaining efficient operation over a wide range of input voltage, since many switched-mode power converter architectures have a peak efficiency over a narrow range of input voltages. One way of addressing the issue of a wide input voltage range is to provide a pre-regulator coupled between the widely variable battery voltage and the switched-mode power converter. This pre-regulator may, itself, be a switched-mode power converter.

SUMMARY OF THE INVENTION

In accordance with an embodiment, a power converter includes an H-bridge switching arrangement, a transformer having a primary winding coupled to an output of the H-bridge switching arrangement, a first switch coupled between a power input of the H-bridge switching arrangement and a first power supply node, and a second switch coupled between a center-tap of the primary winding of the transformer and a low impedance node.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4a-e illustrate schematics and a timing diagram of a further embodiment power converter;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a zero-voltage transition (ZVT) phase shift full bridge switched-mode DC-DC power converter for use in an electric vehicle. The invention may also be applied, however, to other power conversion circuits and architectures directed toward other applications such as, but not limited to, a hard switching full bridge converter, resonant full bridge (LLC), with conversion operation from high voltage (HV) to low voltage (LV), HV to HV, LV to LV, and LV to HV.

In embodiments, a power converter having an H-bridge switching arrangement coupled to a primary winding of a transformer is operated in a first switching mode in which all switches of the H-bridge are utilized at higher input voltages. At lower input voltages, however, the power converter is operated in a second switching mode that utilizes only two of the four switches of the H-bridge switching arrangement, and the remaining two switches are open circuited. In some embodiments, a push-pull operational mode may be employed in the second switching mode.

Figure 1A:
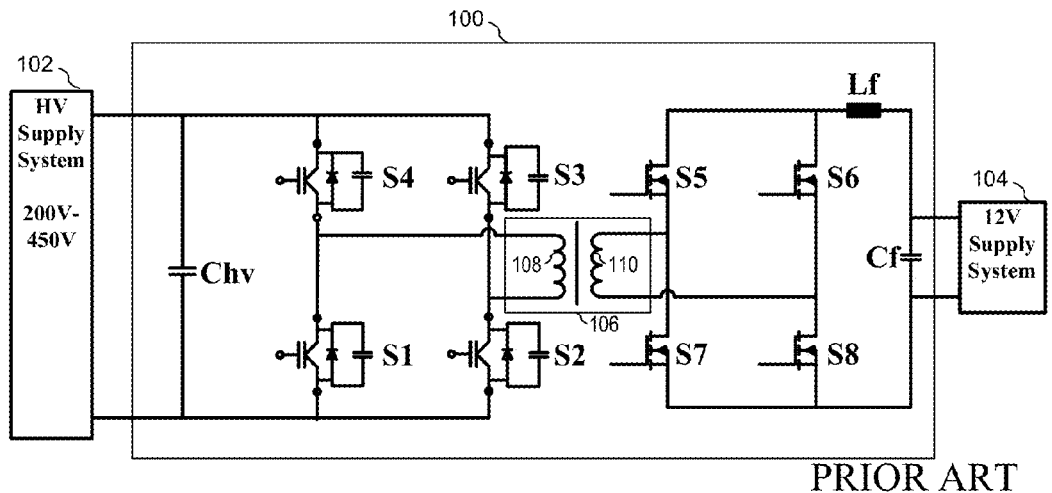
FIGS. 1a-b illustrates a conventional power converter and an associated efficiency curves.

FIG. 1a illustrates a conventional switched mode power converter 100 that may be used, for example, in an automotive power converter system. As shown, power converter 100 converts the output of high-voltage supply system 102 to a low voltage output suitable for powering 12 V supply system 104. Power converter 100 has a primary side including an H-bridge having switches S1, S2, S3 and S4 coupled to primary winding 108 of transformer 106. On the secondary side, power converter 100 has a rectifier that includes diodes or a synchronous rectifier (active rectifier) that has switches S5, S6, S7 and S8 coupled to secondary winding 110 of transformer 106. Inductor Lf and capacitor Cf filters the output of the synchronous rectifier, and capacitor Chv is a filter for the converter primary side.

During operation of power converter 100, diagonally connected switches coupled to primary winding 108 of transformer 106 are periodically closed in order to transfer power from the primary side to the secondary side of power converter 100. For example, switches S1 and S3 may be closed to provide current to primary winding 108 in one direction, and switches S2 and S4 may be closed to provide current to primary winding 108 in the other direction. Similarly, switches S5 and S8 may be closed to provide current to 12 V supply system 104 when the secondary side receives current in a first direction from secondary winding 110, and switches S6 and S7 may be closed to provide current to 12 V supply system 104 when the secondary side receives current in a second direction from secondary winding 110. The signals that control switches S1, S2, S3, S4, S5, S6, S7, and S8 may be generated by a power supply control circuit using principles that are known in the art. For example, switches S1, S2, S3, and S4 may be operated using a zero voltage transition (ZVT) phase shift switching scheme.

In a ZVT switching scheme, switches supplying power to primary winding 108 are turned-on when the voltage across primary winding 108 is about zero or at a very low voltage, thereby reducing switching losses in the switches. Moreover, switches S1 and S2, or switches S3 and S4 are additionally closed during periods of time in which power is not being supplied to primary winding 108. For example, after switches S1 and S4 are closed in order to supply power to primary winding 108, switch S4 is opened and switch S2 is closed to allow energy stored in the leakage inductance of the transformer to circulate. Next, when switch S1 is open and S3 is closed, power is supplied to primary winding 108 in the opposite direction, the circulating energy is recovered, thereby further reducing switching losses.

Figure 1B:
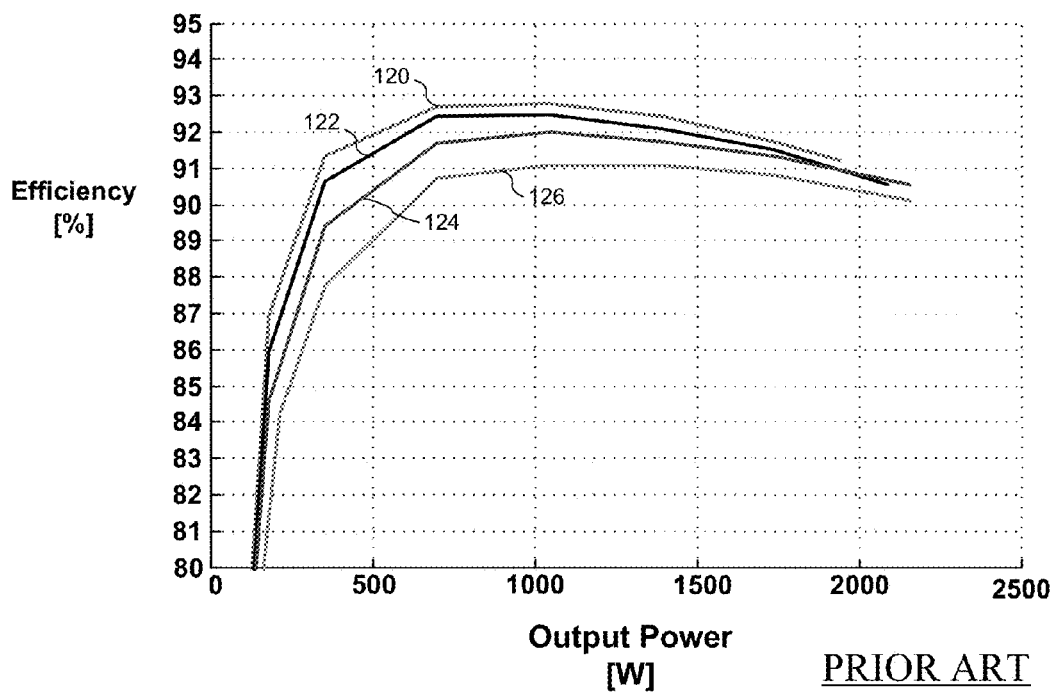

FIG. 1b illustrates a graph of efficiency versus output power for power converter 100 of FIG. 1a. Curve 120 represents an efficiency curve for an input voltage of 160 V of the power converter 100. Curve 122 represents an efficiency curve of power converter 100 with input voltage of 200 V; curve 124 represents an efficiency curve of power converter 100 with an input voltage of 275 V; and curve 126 represents an efficiency curve of power converter 100 with an input voltage of 350 V. As can be seen by the graph of FIG. 1b, the efficiency of the power conversion system declines as the input voltage increases. The waveform diagram of FIG. 1b assumes a turns ratio of about 9:1.

One reason for the decrease in efficiency with increasing input voltages is because, at higher input voltages, the duty cycle of the switching signals is shorter, and the freewheeling periods between power transfer periods are longer. During these freewheeling periods, conduction losses are higher, thereby decreasing the overall efficiency. One factor that determines the duty cycle, and therefore the efficiency of the converter for a given input voltage, is the turns ratio of the transformer. During the design of the power converter, the turns ratio of the transformer is determined so that the power supply provides a maximum or typical output voltage at the minimum input voltage without exceeding a duty cycle of one, or slightly less than one. Another possible reason for lower efficiency in power conversion circuits that have a high input voltage range is conductive losses in secondary side switches S5, S6, S7 and S8. These conductive losses may be exacerbated by the need to use higher voltage devices with higher channel resistance in the secondary side of the power supply in order to withstand maximum output voltages.

One factor that necessitates a wide input voltage range in an automotive power converter is the variation of the battery voltage during one discharge/charge cycle. In a typical electric car battery system, the output voltage of the battery system may be about 450 V when the battery system is fully charged and may go as low as, for example, 200 V when the battery is at the end of its discharge cycle. However, during operation, the battery may spend most of its time at an intermediate voltage, for example at 350 V. In one example, the battery system output voltage may spend only about 0.1% of the time at 450 V, about 1% of the time at 400 V, 85% of the time at 350 V, 12.8% of the time at 300 V, 1% of the time at 250 V and 0.1% of the time at 200V. It should be understood, of course, that these percentages are just one example of a battery system. These time percentages depend on the operation of the vehicle and the specific details of the battery system and the particular electric vehicle utilizing the battery system. Other systems may perform differently with respect to battery discharge behavior. As mentioned above, the minimum voltage requirement (i.e. 200 V in this example) is relevant to the selection of the transformer turns ratio, and the maximum voltage requirement is relevant to the blocking voltage requirements of the secondary stage of the power converter. As can be seen by the above examples, power converter 100 spends most of its time with a 350 V input voltage, even though this region of operation not as efficient as other regions of operation.

Figure 2A:
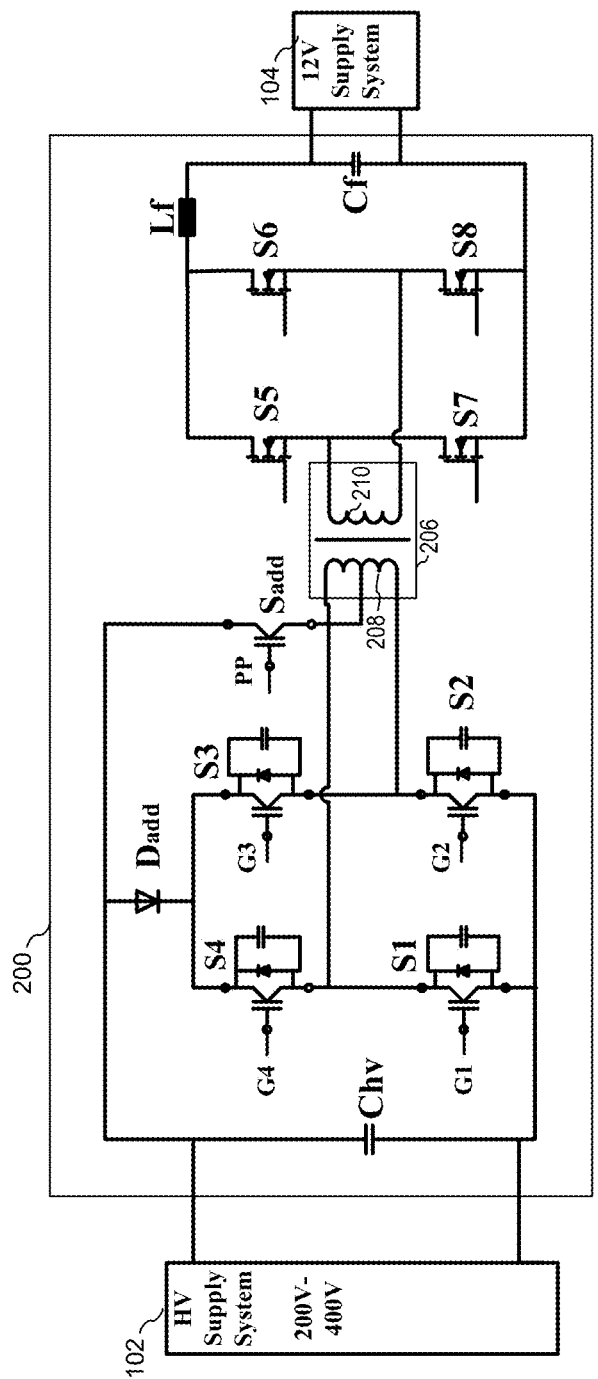
FIGS. 2a-c illustrate schematics of an embodiment power converter circuit.

FIG. 2a illustrates an embodiment power converter 100 configured to convert a high-voltage supply by high-voltage power converter 102 to a lower voltage usable by 12 V supply system 104. Topologically, power converter 200 is similar to power converter 100 with the addition of diode Dadd and switch Sadd coupled to the center tap of the primary winding 208 of transformer 206. Switches S1, S2, S3, S4 and Sadd may be implemented using IGBT switches, and switches S5, S6, S7 and S8 may be implemented using MOSFET switches as shown. Alternatively, other switching transistor types may be used for the switches S1, S2, S3, S4, S5, S6, S7, S8 and Sadd.

Figure 2B:
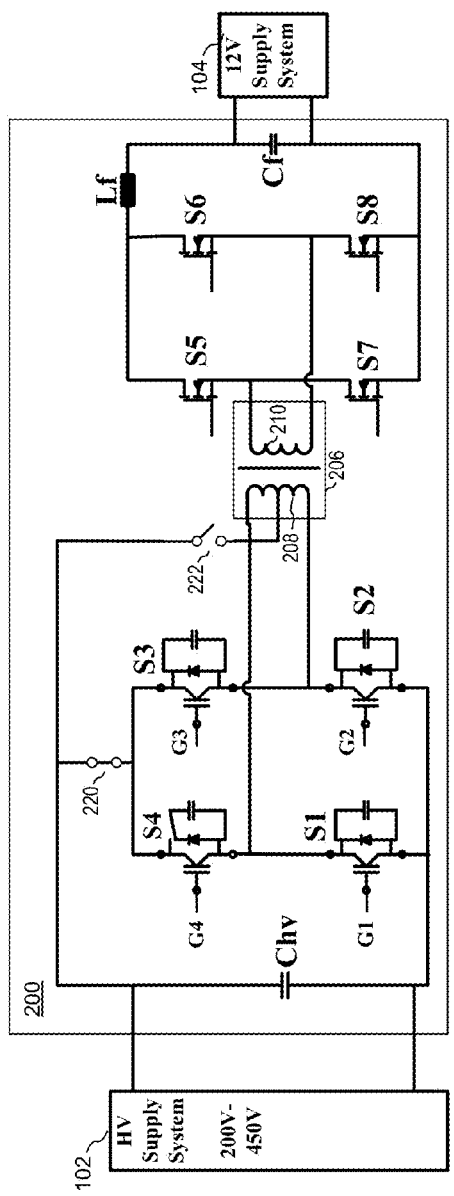

In an embodiment, power converter 200 may operate in two different modes of operation. In a first mode of operation, switch Sadd is open and diode Dadd couples switches S4 and S3 to high-voltage supply system 102. In this configuration, power converter 200 operates using all four switches S1, S2, S3, and S4 of the primary side H-bridge, using the principles described above with respect to power converter 100 of FIG. 1a. For example, power converter 200 may be operated as a ZVT phase shift power converter. This first mode of operation is depicted in FIG. 2b that shows diode Dadd and switching transistor Sadd shown as switches 220 and 222, respectively. Here, switch 220 is shown as being closed and switch 222 is shown as being open, thereby placing center tap 208 of transformer 206 in a high impedance state. It should be further understood that in alternative embodiments, diode Dadd may be implemented using a switching device such as a switching transistor.

Figure 2C:
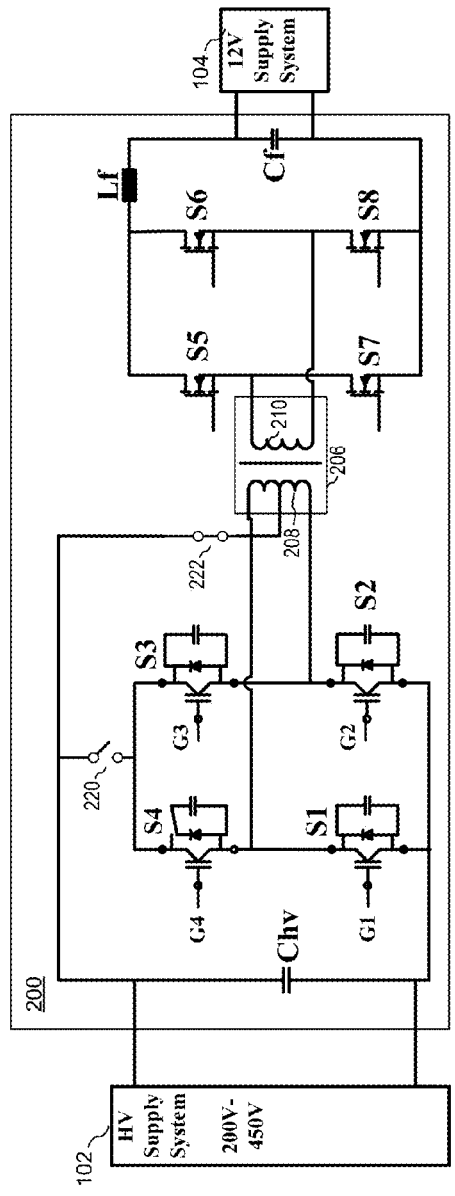

In a second mode of operation, switch Sadd is closed, thereby coupling the center tap of primary winding 208 of transformer 206 to the positive terminal of high-voltage supply system 102. Closing switch Sadd effectively biases diode Dadd in such a way that the diode Dadd goes into a high impedance state, which has the practical effect of open-circuiting switches S3 and S4. In this configuration, power supply 200 may be operated as a push-pull converter utilizing switches S1 and S2. This second mode of operation is depicted in FIG. 2c that shows diode Dadd and switching transistor Sadd shown as switches 220 and 222, respectively. Here, switch 220 is shown as being open and switch 222 is shown as being closed, thereby placing center tap 208 of transformer 206 in a low impedance state. In some embodiments, diode Dadd and switch Sadd also provides reverse polarity protection to the primary side of power converter 200.

In an embodiment, power converter 200 is configured to operate in a push-pull operation mode in the lower range of input voltages, and in a ZVT phase shift mode in a higher range of input voltages. As such, the minimum input voltage for the ZVT mode may be configured to be higher than the minimum input voltage required for power converter 200. Consequently, a larger turns ratio may be used. In one embodiment, the minimum input voltage for ZVT mode is chosen to be about 300 V using a transformer with a turns ratio of about 18:1. By using a larger turns ratio, operation that is more efficient may be achieved at input voltages that correspond to battery voltages at which the battery system spend most of its time. A large turns ratio also reduces the maximum voltage at secondary winding 210, thereby allowing for the use of devices on the secondary side that have a lower blocking voltage and lower losses. It should be understood that the specific parameters mentioned in this example, such as the minimum input voltage and turns ratio, represent just one example of many possible embodiment examples. In alternative embodiments, other voltage ranges and device parameters may be used according to the specifications and requirements of the particular embodiment.

When power converter 200 is operated in the push-pull operating mode at input voltages of less than 300 V, transformer 206 has an effective turns ratio of about 9:9:1 because the center-tap of the transformer is placed in a low-impedance state, and there are about 9 windings from the center tap to each side of primary side 208 of transformer 206.

Figure 3A:
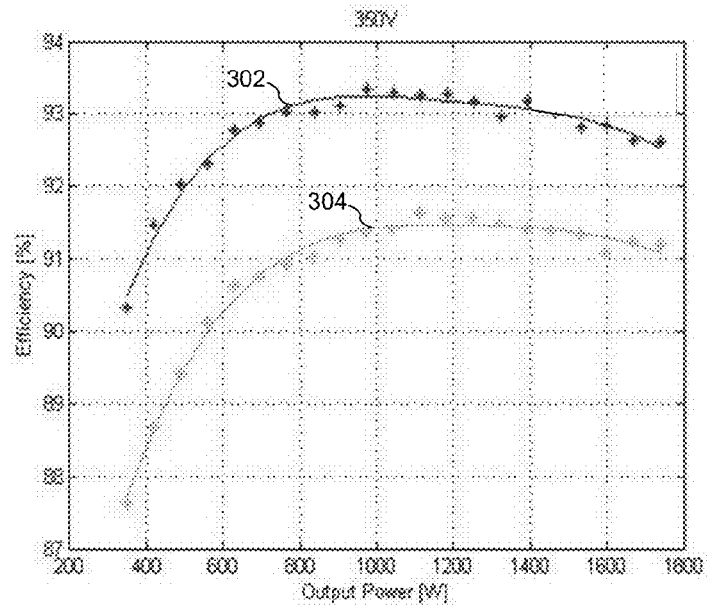
FIGS. 3a-b are graphs comparing the performance of an embodiment power converter circuit with a conventional power converter circuit.

FIG. 3a illustrates a comparison of efficiency curves at input voltages of about 350 V. Curve 302 represents embodiment power converter 200 operating in a phase shifted at ZVT mode of operation with a transformer turns ratio of about 18:1. Curve 304 represents power converter 100 operating in a phase shift at ZVT mode of operation with a transformer turns ratio of about 1:9. It can be seen that power converter 200 has a peak efficiency of greater than 93% at an output power of about 1000 W. On the other hand, power converter 100 has a peak efficiency of about 91.5% at about 1100 W.

Figure 3B:
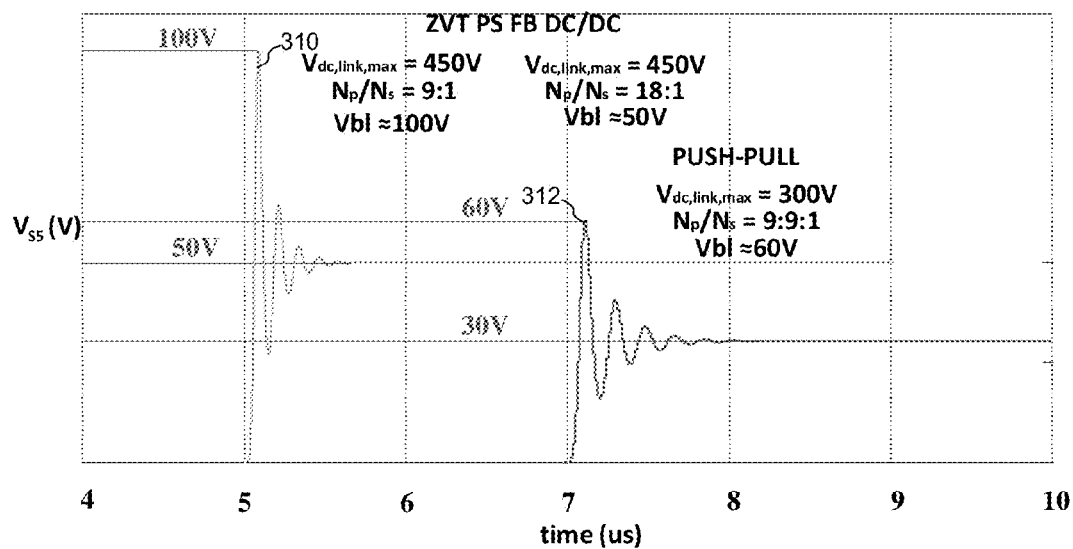

FIG. 3b illustrates a waveform diagram showing time domain transients at the secondary winding or switch (one of the switches S5 to S8). Trace 310 represents a transient voltage at the output of secondary winding 110 of transformer 106; and trace 312 represents a transient voltage at the output of secondary winding 210 of transformer 206. It can be seen that trace 310 hits a maximum peak voltage of about 100 V and settles to a steady-state voltage of about 50 V, while trace 312 has a maximum voltage of about 60 V and settles to a steady state voltage of about 30 V. In one embodiment, the blocking voltage of the devices on the secondary side is determined by the maximum transient voltage expected at the output of the secondary windings. In one example, the MOSFETs used in the secondary side of power converter 100 have a blocking voltage of at least 100 V and a channel resistance of about 4 mΩ when the device is turned on, while the MOSFETs used in the secondary side of power converter 200 have a blocking voltage of at least 60 V and a channel resistance of less than 1 mΩ. As such, the secondary side of power converter 200 may experience lower conduction losses than the secondary side of power converter 100.

FIG. 4a illustrates a power converter system 400 according to a further embodiment of the present invention. The architecture of power converter system 400 is similar to power converter system 200 shown in FIG. 2a, with the addition of controller 402. Controller 402 generates gate control signals G1, G2, G3, G4, G5, G6, G7, G8 and PP that drive the various switching devices on the primary and secondary sides of transformer 206 based on input voltage Vhv and output voltage Vlv. Controller 402 may have other power supply inputs, ground inputs, configuration inputs, other feedback inputs, and other signals that are not shown in FIG. 4a.

FIG. 4b illustrates a more detailed block diagram of controller 402. In an embodiment, 402 has comparator 404 that compares converter input voltage Vhv with reference voltage Vref. In one embodiment, reference voltage Vref represents a power supply input voltage of about 300 V. It should be appreciated, however, that comparator 404 may be implemented using various comparator structures known in the art. It should be further appreciated that in some embodiments of the present invention, comparator 404 may operate on divided input voltages. For example, instead of measuring input voltages in excess of 100 V directly, both the input voltage and the reference voltage to comparator 404 may be divided using resistor dividers and/or other circuits and systems known in the art. Mode logic 406 generates switched signal PP that is used to activate and deactivate switch or switching transistor Sadd. In an embodiment, mode logic 406 includes level shifters and output drivers that generate the proper level to activate and deactivate switching transistor Sadd.

In an embodiment, ZVT controller 408 may be implemented using a phase shifted zero voltage transition controller known in the art to generate signals $G1_{ZVT}$, $G2_{ZVT}$, $G3_{ZVT}$, $G4_{ZVT}$, G5, G6, G7 and G8. More specifically, signals $G1_{ZVT}$, $G2_{ZVT}$, $G3_{ZVT}$ and $G4_{ZVT}$ are generated using phase shifted ZVT techniques, and signals G5, G6, G7 and G8 using synchronous rectifier techniques known in the art. Modification logic 410 produces signals G1, G2, G3 and G4 based on the output of mode logic 406 and the states of signals $G1_{ZVT}$, $G2_{ZVT}$, $G3_{ZVT}$ and $G4_{ZVT}$. In some embodiments, a commercially available controller may be used to implement ZVT controller 408, while comparator 404, mode logic 406, and modification logic 410 are supplied in addition to the commercially available controller. Alternatively, controller 402 may be implemented in a single package, or on a single integrated circuit.

Figure 4C:
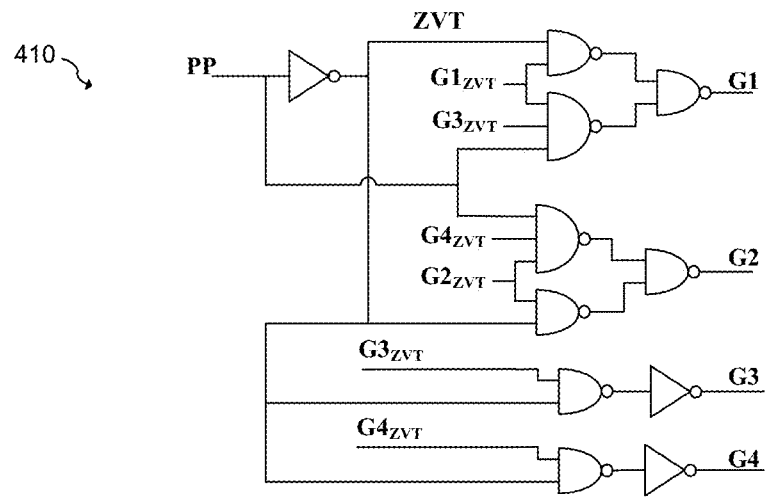

FIG. 4c illustrates a logic schematic that may be used to implement modification logic 410. In an embodiment, signal G1 is logically assigned to be signal $G1_{ZVT}$, signal G2 is logically assigned to be signal $G2_{ZVT}$, signal G3 is logically assigned to be signal $G3_{ZVT}$, and signal G4 is logically assigned to be signal $G4_{ZVT}$ when mode signal PP is low (and ZVT is high) during full bridge ZVT operation. Signal G1 is logically assigned to be signal $G1_{ZVT}$ AND $G3_{ZVT}$, and signal G2 is logically assigned to be signal $G2_{ZVT}$ AND $G4_{ZVT}$ and signal G3 and signal G4 is deactivated (low) when mode signal PP is high (ZVT is low) during push-pull mode operation.

Figure 4D:
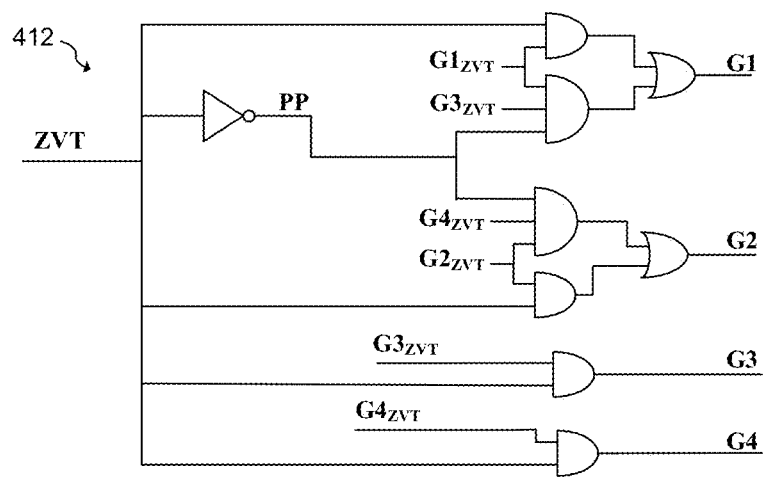

The logic shown in FIG. 4c may be implemented using NAND gates and inverters as illustrated. However, it should be further appreciated that the logical implementation shown in FIG. 4c is just one example of embodiment logic that may be used to implement modification logic 410. For example, a combination of AND gates, OR gates and inverters may be used as shown with respect to modification logic 412 in FIG. 4d. Here, signal ZVT is used as an input from which signal PP is derived. Alternatively, other logically equivalent structures may be implemented using gates, lookup tables, programmable logic, and the like. In further alternative embodiments, logic polarities of modification logic 410 may be different depending on the details of the particular implementation. For example, the polarities may be different if high side switches are driven with active-low control signals.

Figure 4E:
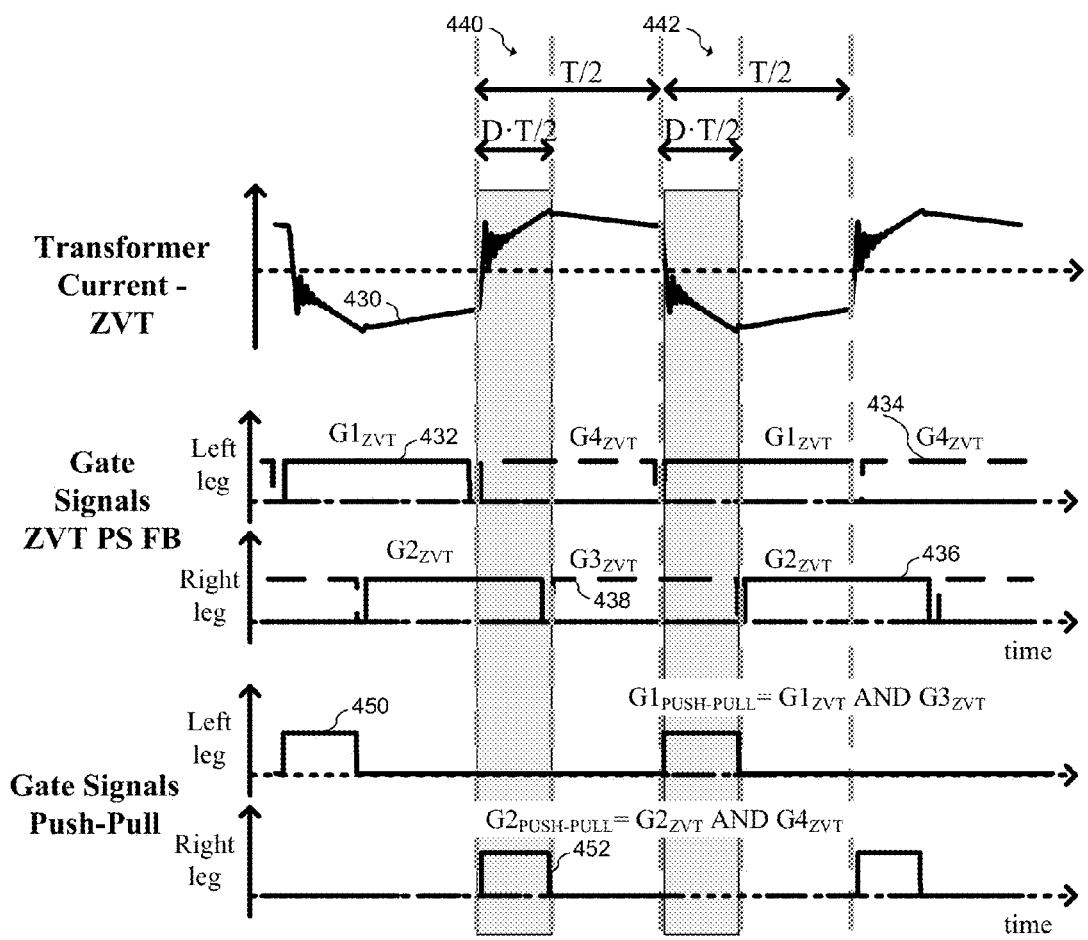

FIG. 4e illustrates a timing diagram of the control signals for power converter 400. Trace 430 represents the transformer current in ZVT mode, and traces 432, 434, 436 and 438 represents control signals $G1_{ZVT}$, $G2_{ZVT}$, $G3_{ZVT}$ and $G4_{ZVT}$, respectively. During time periods 440 and 442, power is delivered to a primary winding 208 of transformer 206. In particular, $G3_{ZVT}$ and $G2_{ZVT}$ overlap each other during time period 440, and $G1_{ZVT}$ and $G4_{ZVT}$ overlap each other during time period 442. During the remaining time, $G1_{ZVT}$ and $G2_{ZVT}$ are simultaneously activated or $G3_{ZVT}$ and $G4_{ZVT}$ are simultaneously activated. Trace 450 represents control signal G1, and trace 452 represents control signal G2 in the push-pull mode of operation as can be seen by the diagram, G1 is set to be the logical AND of signals $G1_{ZVT}$ and $G4_{ZVT}$ and G2 is set to be the logical AND of signals $G3_{ZVT}$ and $G2_{ZVT}$.

Figure 5:
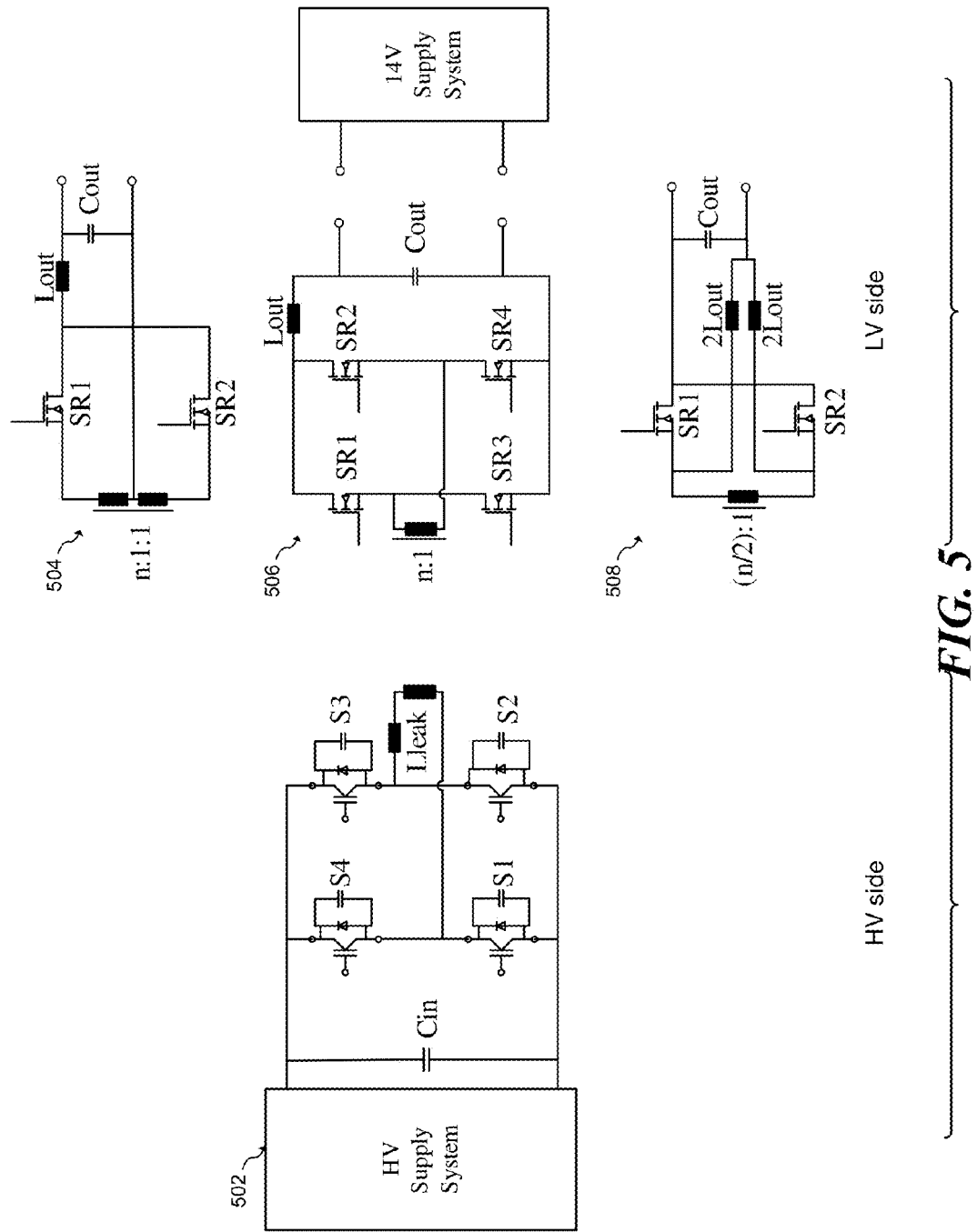
FIG. 5 illustrate schematics of secondary side circuits that may be used with embodiment power converters.

FIG. 5 illustrates an embodiment system having H-bridge 502 on the primary side of the transformer, and various options for the secondary side of the transformer. Secondary side option 506 is a rectifier implemented using an H-Bridge circuit made of MOSFETs SR1, SR2, SR3 and SR4. The operation of circuit 506 is described above with respect to various embodiments described above. In some embodiments, circuit 504 may also be used on the secondary side. Circuit 504 contains switches SR1 and SR2, and may be operated as a full-wave rectifier. In other embodiments, circuit 508, which is a rectifier having a current doubler arrangement, may also be used. In the embodiment of circuit 508, the turns ratio of the transformer is one-half of that for circuit 506. It should be appreciated, however, that circuits 504, 506 and 508 are just three examples of the many possible secondary side circuits that may be used in in embodiment power converters.

Figure 6:
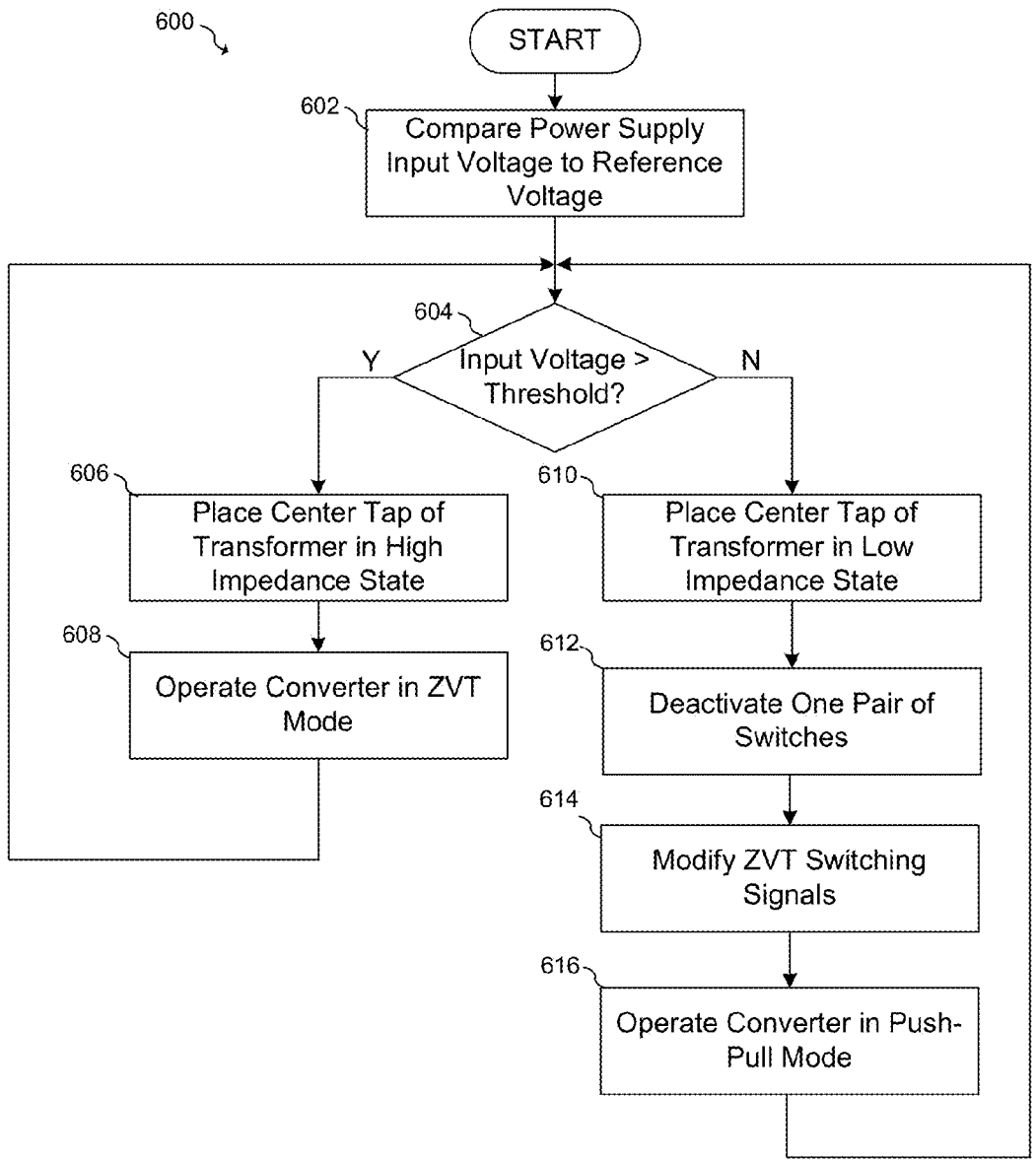
FIG. 6 illustrates a block diagram of an embodiment method.

FIG. 6 illustrates a flowchart of an embodiment method 600. In an embodiment, method 600 begins by comparing a power supply input voltage to a reference voltage in step 602. This comparison may be made, for example, by comparing the voltages directly, or by dividing the power supply input voltage and comparing the divided supply voltage with a divided reference voltage. In some embodiments, this voltage division may be implemented using a resistive voltage dividers and a comparator. If the input voltage is greater than the threshold (step 604), the center tap of the transformer is placed in a high impedance state in step 606 and the power converter is operated in a ZVT mode in step 608 while the input voltage is greater than the threshold as determined by step 604. In some embodiments, the center tap of the transformer may be placed in a high impedance state by opening a switch coupled between a center tap of the transformer and supply input voltage node.

If the input voltage is not greater than the threshold as determined in step 604, the center tap of transformer is placed in a low impedance state in step 610, for example, by closing a switch coupled between the center tap of transformer and the power supply input voltage. Next, in step 612, one pair of switches on the primary side is deactivated. This may be accomplished, for example, by opening a switch coupled between the primary side H-bridge and the power supply input node. In other embodiments, this may be accomplished by inhibiting the activation of these switches. In step 614, switch signals that are generated for ZVT switching are modified to operate the power converter as a push-pull device. Next, in step 616, the power converter is operated as a push-pull power converter while the input voltage is not greater than the threshold as determined by step 604.

In accordance with an embodiment, a power converter includes an H-bridge switching arrangement, a transformer having a primary winding coupled to an output of the H-bridge switching arrangement, a first switch coupled between a power input of the H-bridge switching arrangement and a first power supply node, and a second switch coupled between a center-tap of the primary winding of the transformer and a low impedance node. In some embodiments, the first switch includes a diode coupled between the power input of the H-bridge switching arrangement and the first power supply node, and the low impedance node is connected to the first power supply node. The power converter may also include an output stage coupled between a secondary winding of the transformer and an output node of the power converter.

In an embodiment, the power converter further includes a controller coupled to the first switch and the second switch. The controller is configured to operate the power converter in a first mode by closing the first switch and opening the second switch, and operate the power converter in a second mode by opening the first switch and closing the second switch. The controller may be further configured to operate the power converter in the first mode when a voltage of the first power supply node is above a first voltage threshold, and configured to operate the power converter in the second mode when the voltage of the first power supply node is below the first voltage threshold.

In various embodiments, the controller further includes a control signal generation circuit configured to generate a first pair of pulse width modulated signals and a second pair of pulse width modulated signals and a logic circuit having inputs configured to receive the first pair of pulse width modulated signals and configured to receive the second pair of pulse width modulated signals. The logic circuit further has a first pair of outputs coupled to a first pair of switches of the H-bridge switching arrangement, and a second pair of outputs coupled to a second pair of switches of the H-bridge switching arrangement. In some embodiments, the logic circuit may be configured to logically assign the first pair of pulse width modulated signals to the first pair of outputs, and logically assign the second pair of pulse width modulated signals to the second pair of outputs when the power supply is operating in the first mode. The logic circuit may be further configured to assert the first pair of outputs based on logic states of the first pair of pulse width modulated signals and of the second pair of pulse width modulated signals when the power supply is operating in the second mode.

In an embodiment, the first pair of pulse width modulated signals includes a first signal and a second signal, the second pair of pulse width modulated signals includes a third signal and a fourth signal, and the first pair of outputs comprises a fifth signal and a sixth signal. The logic circuit is configured to produce the fifth signal as a logical AND of the first signal and the third signal when the power supply is operating in the second mode, and configured to produce the sixth signal as the logical AND of the second signal and the fourth signal when the power supply is operating in the second mode.

In an embodiment, the first mode includes a zero voltage phase shift switching mode, and the second mode includes a push-pull switching mode. The H-bridge switching arrangement may include a pair of high-side switches and a pair of low-side switches. In an embodiment, the high-side switches and the low-side switches are configured to be active when the power converter is in the zero voltage phase shift switching mode, and only the low-side switches are configured to be active when the power converter is in the push-pull switching mode. In some embodiments, the low-side switches are configured to be enabled when zero voltage phase shift switching signals are in a diagonal switching pattern.

In accordance with a further embodiment, a method of operating a power supply includes operating an H-bridge switching arrangement coupled to a primary coil of a transformer in a first mode comprising applying switching signals to each switch in the H-bridge switching arrangement, and driving a center-tap of the primary coil in a high impedance state. The method further includes operating the H-bridge switching arrangement in a second mode comprising placing the center-tap of the primary coil in a low impedance state and open-circuiting a supply node of the H-bridge switching arrangement. In some embodiments, the method further includes comparing a voltage of the supply node to a threshold, operating the power supply in the first mode when the voltage of the supply node is greater than the threshold, and operating the power supply in the second mode when the voltage of the supply node is not greater than the threshold.

The first mode may include a zero voltage phase shift mode, and the second mode may include a push-pull mode.

In an embodiment, the supply node of the H-bridge switching arrangement is coupled to high-side switches of the H-bridge switching arrangement. The H-bridge switching arrangement may include a first switch and a second switch coupled between a second supply node of the H-bridge switching arrangement and the primary coil, and a third switch and a fourth switch coupled between a the supply node and the primary coil. The method may further include determining a first switching signal, a second switching signal, a third switching signal and a fourth switching signal, driving the first switch with the first switching signal, the second switch with the second switching signal, the third switch with the third switching signal and the fourth switch with the fourth switching signal when H-bridge switching arrangement is operating in the first mode, and modifying the switching signals coupled to a first switch and the second switch of the H-bridge switching arrangement when the H-bridge switching arrangement is operating in the second mode.

In an embodiment, modifying the switching signals includes determining a first modified switching signal to be a logical AND of the first switching signal and the fourth switching signal, and determining a second modified switching signal to be a logical AND of the second switching signal and the third switching signal. The method may further include driving the first switch with the first modified switching signal and the second switch with the second modified switching signal when the H-bridge switching arrangement is operating in the second mode. In an embodiment, determining the first switching signal, the second switching signal, the third switching signal and the fourth switching signal includes determining phase shift zero-voltage transition (ZVT) PWM signals.

In accordance with another embodiment, a power supply circuit includes a switching device coupled to a primary winding of a transformer, a first switch coupled between a power input node of the switching device and a first power supply node, a second switch coupled between a center-tap of the primary winding of the transformer and a low impedance node, and a controller configured to operate the power supply circuit in a zero voltage transition (ZVT) mode by closing the first switch and opening the second switch, and to operate the power supply circuit in a push-pull switching mode by opening the first switch and closing the second switch.

In an embodiment, the controller is configured to operate the power supply circuit in the ZVT mode when the a voltage of the first power supply node is above a first voltage threshold, an is configured to operate the power supply circuit in the push-pull switching mode when the voltage of the first power supply node is below the first voltage threshold.

In some embodiments, the first switch includes a diode coupled between the power input node of the switching device and the first power supply node, and the low impedance node is connected to the first power supply node. The switching device may include an H-bridge switching circuit having a first switch and a second switch coupled between a reference node and the primary winding, and a third switch and a fourth switch coupled between the first power supply node and the primary winding. In some embodiments, the reference node is a ground node.

The power supply may further include a drive modification circuit configured to drive a control input of the first switch with a logical AND of ZVT control signals for the first switch and the fourth switch, and drive a control input of the second switch with a logical AND of ZVT control signals for the second switch and the third switch.

An advantage of embodiments includes the ability to achieve a higher efficiency for power converters having a wide input voltage range. A further advantage includes the ability to provide reverse polarity protection to the primary side of a switched-mode power converter.

An advantage of embodiment systems that incorporate a redundant turn-off switch is the ability to withstand failures in the case where one switch has a short circuit and the current is limited or blocked by the redundant switch.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A power converter comprising:
   an H-bridge switching arrangement, wherein the H-Bridge switching arrangement comprises a pair of high side switches and a pair of low side switches;
   a transformer having a primary winding coupled to an output of the H-bridge switching arrangement;
   a first switch coupled between a power input of the H-bridge switching arrangement and a first power supply node;
   a first circuit path that extends from a center-tap of the primary winding to a low impedance node, the first circuit path being external to the primary winding;
   a second switch coupled within the first circuit path; and
   a controller coupled to the first switch and the second switch, the controller configured to:
   operate the power converter in a first mode by closing the first switch and opening the second switch, and
   operate the power converter in a second mode by opening the first switch and closing the second switch.

2. The power converter of claim 1, wherein;
   the first switch comprises a diode coupled between the power input of the H-bridge switching arrangement and the first power supply node; and
   the low impedance node is connected to the first power supply node.

3. The power converter of claim 1, wherein the controller is configured to operate the power converter in the first mode when a voltage of the first power supply node is above a first voltage threshold, and the controller is configured to operate the power converter in the second mode when the voltage of the first power supply node is below the first voltage threshold.

4. The power converter of claim 1, wherein the controller further comprises
   a control signal generation circuit configured to generate a first pair of pulse width modulated signals and a second pair of pulse width modulated signals; and
   a logic circuit comprising
   inputs configured to receive the first pair of pulse width modulated signals and configured to receive the second pair of pulse width modulated signals,
   a first pair of outputs coupled to a first pair of switches of the H-bridge switching arrangement, and
   a second pair of outputs coupled to a second pair of switches of the H-bridge switching arrangement.

5. The power converter of claim 4, wherein:
   the logic circuit is configured to logically assign the first pair of pulse width modulated signals to the first pair of outputs, and logically assign the second pair of pulse width modulated signals to the second pair of outputs when the power supply is operating in the first mode; and the logic circuit is configured to assert the first pair of outputs based on logic states of the first pair of pulse width modulated signals and of the second pair of pulse width modulated signals when the power supply is operating in the second mode.

6. The power converter of claim 5, wherein:
the first pair of pulse width modulated signals comprises a first signal and a second signal;
the second pair of pulse width modulated signals comprises a third signal and a fourth signal;
the first pair of outputs comprises a fifth signal and a sixth signal;
the logic circuit is configured to produce the fifth signal as a logical AND of the first signal and the third signal when the power supply is operating in the second mode; and
the logic circuit is configured to produce the sixth signal as a logical AND of the second signal and the fourth signal when the power supply is operating in the second mode.

7. The power converter of claim 1, wherein
the first mode comprises a zero voltage phase shift switching mode; and
the second mode comprises a push-pull switching mode.

8. The power converter of claim 7, wherein:
a pair of high-side switches and a pair of low-side switches are configured to be active when the power converter is in the zero voltage phase shift switching mode; and
only the pair of low-side switches are configured to be active when the power converter is in the push-pull switching mode.

9. The power converter of claim 8, wherein the pair of low-side switches are configured to be enabled when zero voltage phase shift switching signals are in a diagonal switching pattern.

10. The power converter of claim 1, further comprising an output stage coupled between a secondary winding of the transformer and an output node of the power converter.

11. The power converter of claim 1, wherein
operating the power converter in the first mode comprises applying switching signals to each switch in the H-bridge switching arrangement; and
operating the power converter in the second mode comprises applying switching signals to the pair of high side switches and deactivating the pair of high side switches of the H-bridge switching arrangement.

12. The power converter of claim 1, wherein
the first mode comprises an H-bridge mode, wherein the H-bridge mode comprises switching the pair of high side switches and the pair of low side switches; and
the second mode comprises a push-pull mode, wherein the push-pull mode comprises switching the pair of low side switches only.

13. A method of operating a power supply comprising:
operating an H-bridge switching arrangement coupled to a primary coil of a transformer in a first mode comprising applying switching signals to each switch in the H-bridge switching arrangement, and driving a center-tap of the primary coil in a high impedance state and the H-bridge switching arrangement comprises a first switch and a second switch coupled between a second power supply node of the H-bridge switching arrangement and the primary coil, and a third and a fourth switch coupled between a supply node and the primary coil, wherein driving the center-tap of the primary coil in the high impedance state comprises turning off a fifth switch coupled within a first circuit path, wherein the first circuit path extends from the center-tap of the primary coil to a low impedance node, the first circuit path being external to the primary coil, and operating the H-bridge switching arrangement in the first mode further comprises turning on a sixth switch coupled between a converter power supply node and the supply node of the H-bridge switching arrangement; and
operating the H-bridge switching arrangement in a second mode comprising placing the center-tap of the primary coil in a low impedance state by turning on the fifth switch and open-circuiting the supply node of the H-bridge switching arrangement by turning off the sixth switch.

14. The method of claim 13, further comprising
comparing a voltage of the supply node to a threshold;
operating the power supply in the first mode when the voltage of the supply is greater than the threshold; and
operating the power supply in the second mode when the voltage of the supply node is not greater than the threshold.

15. The method of claim 13, wherein:
the first mode comprises a zero voltage phase shift mode; and
the second mode comprises a push-pull mode.

16. The method of claim 13, wherein the supply node of the H-bridge switching arrangement is coupled to high-side switches of the H-bridge switching arrangement.

17. The method of claim 13, wherein
the method further comprises
determining a first switching signal, a second switching signal, a third switching signal and a fourth switching signal,
driving the first switch with the first switching signal, the second switch with the second switching signal, the third switch with the third switching signal and the fourth switch with the fourth switching signal when H-bridge switching arrangement is operating in the first mode, and
modifying the switching signals coupled to a first switch and the second switch of the H-bridge switching arrangement when the H-bridge switching arrangement is operating in the second mode.

18. The method of claim 17, wherein
modifying the switching signals comprises determining a first modified switching signal to be a logical AND of the first switching signal and the fourth switching signal, and determining a second modified switching signal to be a logical AND of the second switching signal and the third switching signal; and
the method further comprises driving the first switch with the first modified switching signal, and the second switch with the second modified switching signal when the H-bridge switching arrangement is operating in the second mode.

19. The method of claim 17, wherein determining the first switching signal, the second switching signal, the third switching signal and the fourth switching signal comprises determining phase shift zero-voltage transition (ZVT) PWM signals.

20. The method of claim 13, wherein operating the H-bridge switching arrangement in the second mode comprises switching the first switch and the second switch and deactivating the third and the fourth switch.

21. The method of claim 17, wherein modifying further comprises turning off the third and the fourth switch.

22. The method of claim 13, wherein:
operating in the first mode comprises operating in an H-bridge switching mode, wherein the H-bridge switching mode comprises switching the first switch, the second switch, the third switch and the fourth switch; and
operating in the second mode comprises operating in a push-pull switching mode, wherein the push-pull switching mode comprises switching the first switch and the second switch only.

23. A power supply circuit comprising:
a switching device coupled to a primary winding of a transformer, wherein the switching device comprises an H-bridge switching circuit comprising a first H-bridge switch and a second H-bridge switch coupled between a reference node and the primary winding, and a third H-bridge switch and a fourth H-bridge switch coupled between a first power supply node and the primary winding;
a first switch coupled between a power input node of the switching device and a first power supply node;
a second switch coupled within a first circuit path, wherein the first circuit path extends from a center-tap of the primary winding to a low impedance node, the first circuit path being external to the primary winding; and
a controller configured to operate the power supply circuit in a zero voltage transition (ZVT) mode by closing the first switch and opening the second switch, and to operate the power supply circuit in a push-pull switching mode by opening the first switch and closing the second switch.

24. The power supply circuit of claim 23, wherein the controller is configured to operate the power supply circuit in the ZVT mode when a voltage of the first power supply node is above a first voltage threshold, and the controller is configured to operate the power supply circuit in the push-pull switching mode when the voltage of the first power supply node is below the first voltage threshold.

25. The power supply circuit of claim 23, wherein:
the first switch comprises a diode coupled between the power input node of the switching device and the first power supply node; and
the low impedance node is connected to the first power supply node.

26. The power supply circuit of claim 23, wherein the reference node comprises a ground node.

27. The power supply of claim 23, further comprising a drive modification circuit configured to drive a control input of the first switch with a logical AND of ZVT control signals for the first H-bridge switch and the fourth H-bridge switch, and drive a control input of the second H-bridge switch with a logical AND of ZVT control signals for the second H-bridge switch and the third H-bridge switch.

28. The power supply circuit of claim 23, wherein operating the power supply circuit in the ZVT mode comprises applying switching signals to each H-bridge switch in the H-bridge switching arrangement; and
operating the power supply circuit in the push-pull mode comprises applying switching signals to the first H-bridge switch and the second H-bridge switch and deactivating the third H-bridge and the fourth H-bridge switch of the H-bridge switching arrangement.

* * * * *